United States Patent [19]
Tomlinson et al.

[11] Patent Number: 5,379,588
[45] Date of Patent: Jan. 10, 1995

[54] REHEAT STEAM CYCLE FOR A STEAM AND GAS TURBINE COMBINED CYCLE SYSTEM

[75] Inventors: Leroy O. Tomlinson, Schenectady; Raub W. Smith, Saratoga, both of N.Y.

[73] Assignee: General Electric Company, Schenectady, N.Y.

[21] Appl. No.: 887,391

[22] Filed: May 21, 1992

Related U.S. Application Data

[63] Continuation of Ser. No. 615,794, Nov. 20, 1990, abandoned.

[51] Int. Cl.$^6$ ............................................ F02C 6/00
[52] U.S. Cl. .................... 60/39.182; 60/653; 60/676; 60/698
[58] Field of Search ............... 60/39.182, 653, 676, 60/698

[56] References Cited

U.S. PATENT DOCUMENTS

| | | | |
|---|---|---|---|
| 3,691,760 | 9/1972 | Vidal et al. | 60/39.182 |
| 3,879,616 | 4/1975 | Baker et al. | 60/39.182 |
| 4,424,668 | 1/1984 | Mukherjee | 60/39.182 |
| 4,576,124 | 3/1986 | Martens et al. | 60/39.182 X |
| 5,042,247 | 8/1991 | Moore | 60/39.03 |

*Primary Examiner*—Stephen F. Husar
*Attorney, Agent, or Firm*—Nixon & Vanderhye

[57] ABSTRACT

A combined cycle power system is disclosed in which condensate from a steam turbine is reheated in at least one heat recovery steam generator by exhaust gas from at least one gas turbine, and wherein at east one heat recovery steam generator includes at least one superheater and at least one reheater. In a preferred arrangement, the high temperature section of the superheater is located within the heat recovery steam generator so as to present first heat exchange surfaces to exhaust gas entering the heat recovery steam generator from at least one gas turbine, to thereby lower the exhaust gas temperature at the inlet to the reheater.

20 Claims, 4 Drawing Sheets

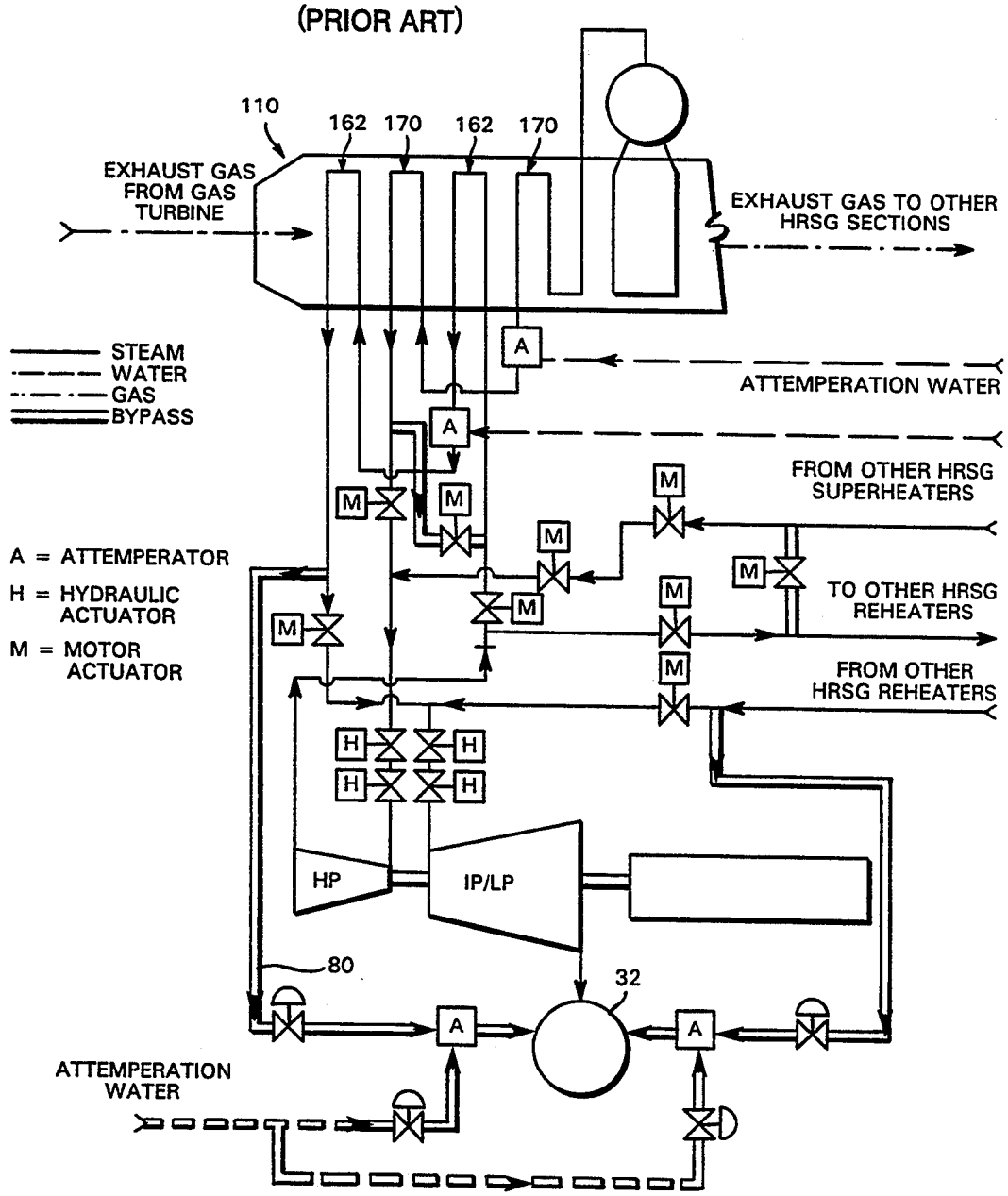

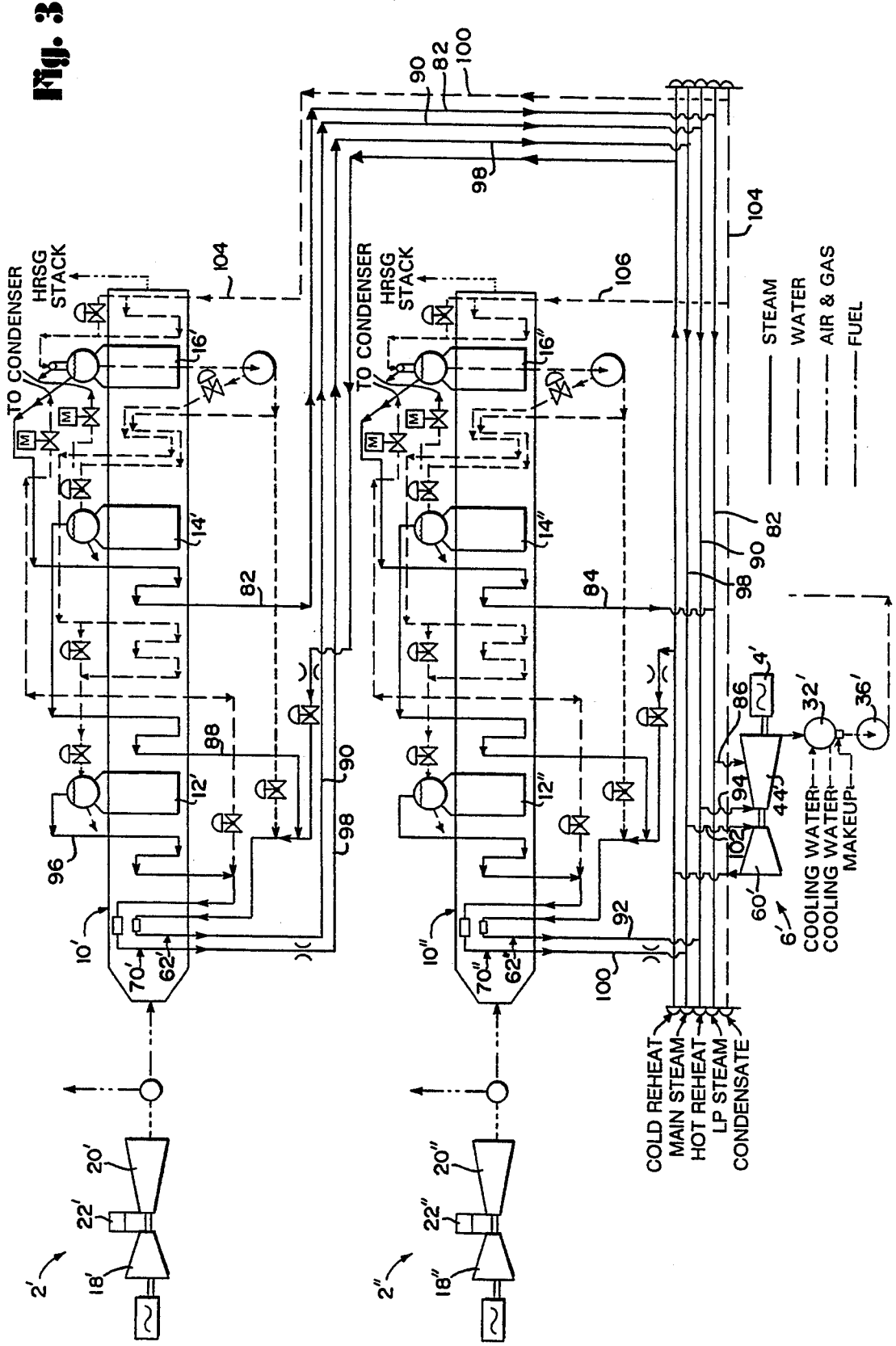

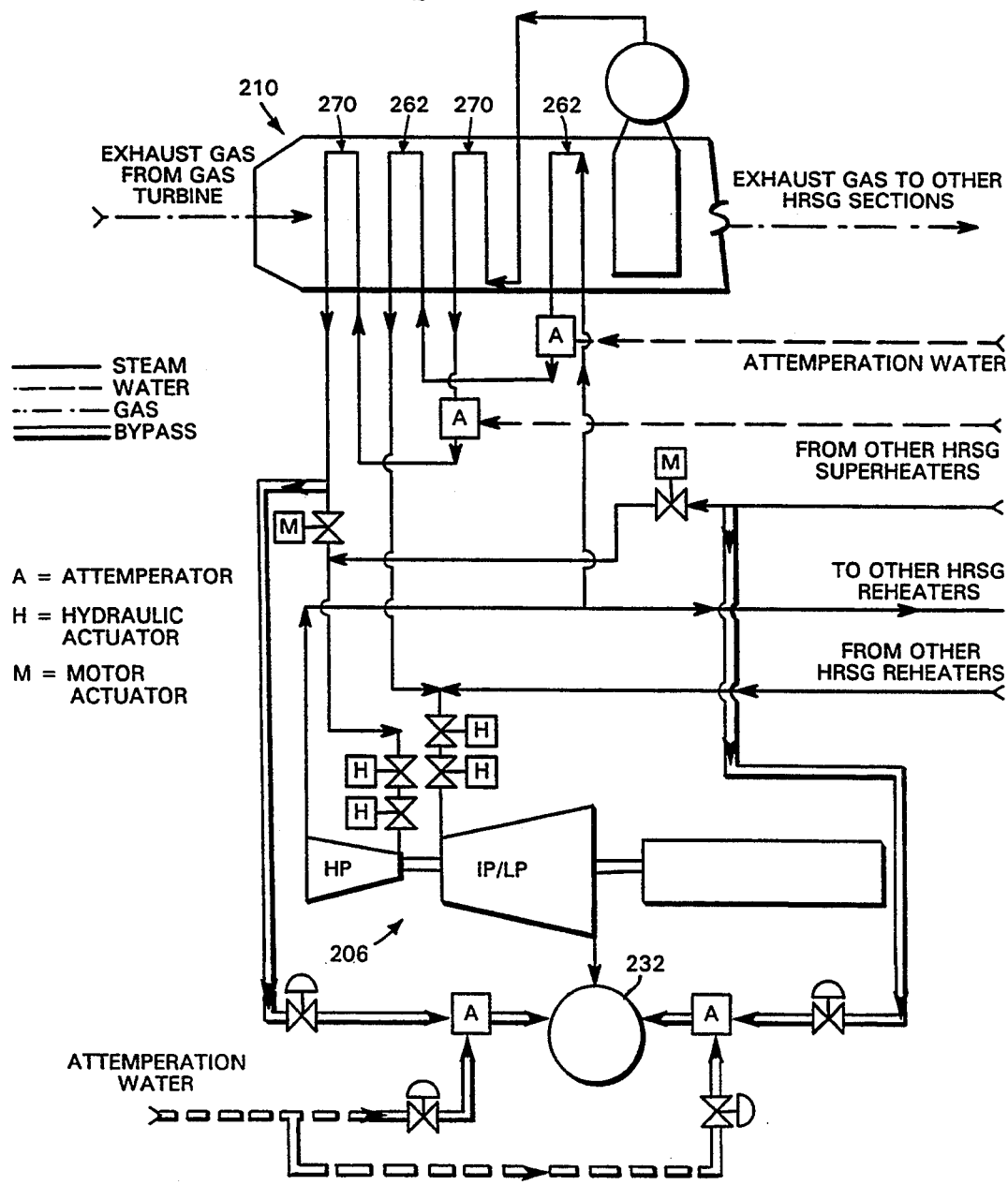

REHEAT STEAM CYCLE FOR A STEAM AND GAS TURBINE COMBINED CYCLE SYSTEM

This is a continuation of application Ser. No. 07/615,794, filed Nov. 20, 1990, now abandoned.

BACKGROUND AND SUMMARY OF THE INVENTION

This invention relates to combined-cycle thermal energy and power systems and, specifically, to systems which combine gas turbines, steam generators, heat recovery steam generators, generators and associated controls for the production of electrical power.

Currently available combined-cycle systems of the assignee of this invention include single and multi-shaft configurations. Single shaft configurations consist of one gas turbine, one steam turbine, one generator and one heat recovery steam generator (HRSG). The gas turbine and steam turbine are coupled to the single generator in a tandem arrangement on a single shaft. Multi-shaft systems, on the other hand, have one or more gas turbine-generators and HRSG's that supply steam through a common steam header to a single steam turbine-generator. In either case, steam is generated in one or more unfired HRSG's for delivery to the condensing steam turbine.

Conventional practice for reheat steam cycles utilizing reheat is generally to configure the steam system with one steam turbine to one HRSG. In a single gas turbine/steam turbine/HRSG system, condensate from the condenser is pumped directly to the HRSG where steam is generated by heat supplied by the gas turbine exhaust gases, and is thereafter returned to the steam turbine.

In the conventional practice, the temperature of steam admitted to the steam turbine throttle, i.e., the main steam, and the temperature of the reheated steam are set at the maximum permitted by the materials employed in the boiler superheaters, steam piping, valves and steam turbines. Exemplary temperatures are in the range of 1000° F. (538° C.) to 1050° F. (566° C.). It is also conventional practice to locate the high temperature section of the HRSG reheater in that section of the HRSG where gas turbine exhaust gas temperature is highest, i.e., adjacent the gas turbine exhaust gas inlet to the HRSG. While this arrangement is satisfactory in single gas turbine/steam turbine/HRSG systems, problems arise in multiple gas turbine/HRSG, single steam turbine systems which would otherwise be preferred.

In reheat combined cycle systems where there are multiple gas turbines and multiple HRSG's for a single steam turbine, the steam from the superheater in each HRSG is combined and flows to the high pressure (HP) section of the steam turbine. The steam passes through the HP turbine where it is extracted for reheating. The steam exhausting from the HP turbine must be distributed uniformly to the reheaters in the multiple HRSG's since reduced flow to one reheater will result in higher operating temperature for that reheater, potentially damaging it if the temperature is increased above its operating limit as a result of heat damage to the reheater tube material. This process is inherently unstable since increased temperature of the steam passing through the reheater with lowest flow increases the specific volume and velocity of the steam, which further increases its pressure drop, thus further reducing the flow which causes the tube wall temperature to increase even further. Therefore, a control system is required consisting of main steam flow measurement, cold reheat steam flow control valves, and a master control system to match the main steam flow and reheat steam flow for each HRSG.

A second problem that requires solution for a successful combined cycle system as described above is prevention of overheating of the reheater during system start-up. A system where the high temperature sections of the reheaters are exposed to the highest exhaust gas temperatures requires some means for cooling the reheater during start-up of the HRSG, prior to admitting steam to the steam turbine, i.e., when there is no steam flow from the HP section of the steam turbine to the reheater. The reheater can be cooled as done in conventional steam turbine practice by temporarily connecting (during starting) the steam from the HRSG superheater to the reheater, then to the condenser. This start-up bypass system, which places the reheater and superheater in series, involves additional system complexity and cost.

As noted previously, one present practice is to utilize a single steam turbine and a single HRSG. This arrangement precludes the potential for mismatch between main steam flow and reheat flow, and also enables convenient start-up of the HRSG steam turbine. It is otherwise disadvantageous in that one steam turbine is required for each gas turbine in a combined cycle, again increasing plant cost.

For combined cycle systems, it is desirable, therefore, to configure the steam cycle with multiple gas turbines and HRSG's, and one steam turbine. It is therefore the principal object of this invention to provide a steam cycle arrangement which tolerates mismatch of main and reheat steam flow, i.e., any mismatch which does occur will not result in excessively high temperature in the reheater. In addition, the present invention seeks to eliminate the current requirement for bypassing main steam from the superheater through the reheater during HRSG start-up in multiple gas turbine/HRSG systems.

In accordance with an exemplary embodiment of the invention, the high temperature section of the superheater, and not the high temperature section of the reheater (as in prior designs), is the HRSG component that is exposed to the highest gas turbine exhaust temperature. The heat transfer duty of the superheater is sufficient to reduce the gas turbine exhaust temperature at the inlet to the reheater so that the potential for operation of the reheater above its rated operating temperature, and for damage as a result, is minimized. At the same time, the steam cycle arrangement enables start-up of the HRSG's without diverting superheater steam through the reheater. In the simplified system of this invention, superheater steam from the multiple HRSG's is diverted around the steam turbine to the condenser, while attemperation water is supplied to the reheater. This is sufficient to prevent overheating of the reheater during start-up because of the relocation of the high temperature section of the reheater behind the superheater, i.e., downstream in the direction of gas turbine exhaust flow.

Thus, in accordance with one aspect of the invention, there is provided a combined cycle power system in which condensate from a steam turbine is heated in at least one heat recovery steam generator by exhaust gas from at least one gas turbine, and wherein at least one heat recovery steam generator includes at least one superheater and at least one reheater, the improvement comprising locating at least a high temperature section of the superheater within the heat recovery steam generator so as to present first heat exchange surfaces to exhaust gas entering the heat recovery steam generator from said at least one gas turbine.

In accordance with another aspect of the invention, there is provided reheat steam cycle configuration for a steam turbine and gas turbine combined cycle system comprising: a steam turbine connected to a load; a condenser for receiving exhaust steam from the steam turbine and for condensing the exhaust steam to water; at least one heat recovery steam generator for receiving water from the condenser and for converting the water to steam for return to the steam turbine; at least one gas turbine for supplying heat to the heat recovery steam generator in the form of exhaust gases; wherein at least one heat recovery steam generator includes a reheater for receiving cold reheat steam from the steam turbine and a superheater for receiving high pressure steam from a high pressure evaporator within the heat recovery steam generator, and wherein the cold reheat steam and the high pressure steam flow in a direction opposite to that of the exhaust gases from the gas turbine, a high temperature section of the superheater being located within the heat recovery steam generator where gas turbine exhaust gas temperatures are highest.

In accordance with still another aspect of the invention, there is provided a method for supplying steam to a steam turbine from a plurality of heat recovery steam generators, each of which includes a plurality of evaporators, a reheater and a superheater and wherein at least the reheater and superheater are arranged in heat exchange relationship with hot exhaust gas from a gas turbine, the method comprising the steps of:

a) locating a high temperature section of the superheater adjacent a gas turbine exhaust gas inlet to the heat recovery steam generator;

b) locating a high temperature section of the reheater adjacent the superheater, downstream of the high temperature section of the superheater in a direction of flow of the gas turbine exhaust gas; and c) flowing condensate and steam from the steam turbine in a direction opposite the direction of flow of the gas turbine exhaust gas so that the gas turbine exhaust gas temperature is reduced when it passes over the reheater to thereby minimize potential overheating of the reheater.

Other objects and advantages of the subject invention will become apparent from the detailed description which follows.

BRIEF DESCRIPTION OF THE DRAWINGS

FIG. 2 is a diagram of a known bypass arrangement for HRSG start-up;

FIG. 3 is a diagram of a steam cycle for a combined cycle system employing multiple gas turbines and HRSG's with a single steam turbine in accordance with an exemplary embodiment of the invention; and FIG. 4 is a diagram of a simplified bypass arrangement for HRSG start-up in accordance with this invention.

DETAILED DESCRIPTION OF THE DRAWINGS

Figure 1:
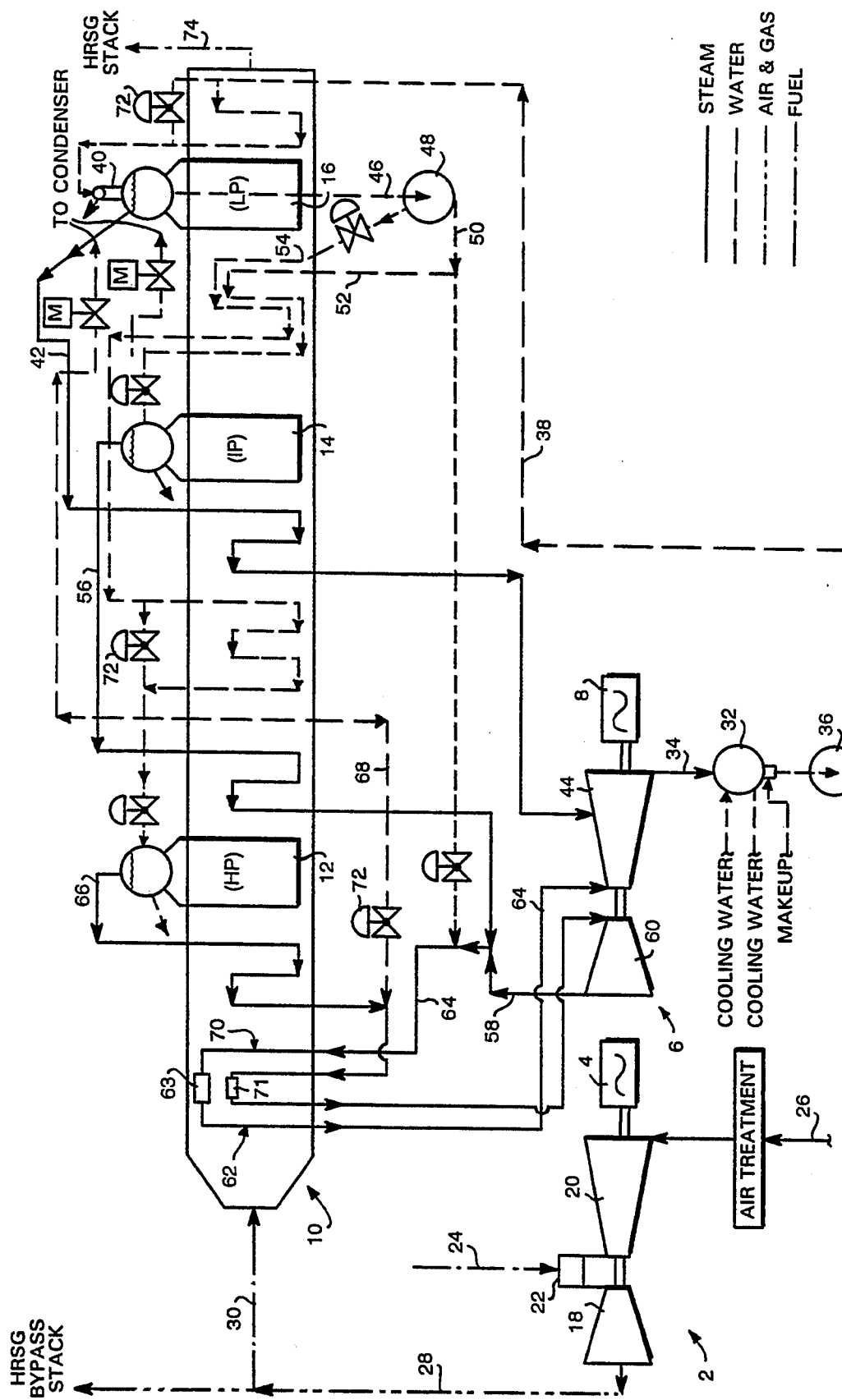
FIG. 1 is a diagram of a conventional steam cycle utilized in known steam and gas turbine combined cycle systems.

Referring to FIG. 1, a conventional combined cycle steam system typically used for electric power production and industrial cogeneration applications is shown.

The system includes a single gas turbine 2 connected to a load, such as a generator 4, and a single steam turbine 6 connected to a load, such as a generator 8. While the system illustrated in FIG. 1 is a multi-shaft configuration, it will be understood that similar systems are utilized with single-shaft configurations. In addition, the steam cycle arrangement shown in FIG. 1 is similar to those employed in conventional multiple gas turbine/HRSG and single steam turbine systems.

The hot exhaust gas from the turbine 2 flows to a single (preferably unfired) heat recovery steam generator (HRSG) 10 which supplies steam to the steam turbine 6. The illustrated HRSG 10 is a three pressure-reheat, heat recover feedwater steam cycle which includes generally a high pressure (HP) evaporator 12, an intermediate pressure (IP) evaporator 14 and a low pressure (LP) evaporator 16 which convert condensate from the steam turbine 6 to steam for reintroduction to the same steam turbine. This system is available from the assignee of the present invention under the STAG TM product line.

More specifically, the gas turbine 2 includes a turbine 18, a compressor 20, and a combustion chamber 22 supplied with fuel via line 24. Air is fed into the compressor 20 via line 26. Exhaust gas from the gas turbine 2 flows through line 28 and to the HRSG 10 via line 30. Prior to start up of the steam turbine 6, the exhaust gas from gas turbine 2 flows directly to an HRSG bypass stack, described in more detail below with respect to FIG. 3.

The HRSG 10 is provided with finned-tube heat transfer surfaces (not shown) for the reheater and superheater, along with the three natural or forced circulation evaporators 12, 14 and 16 (drum type or "once-thru" type or any other conventional type evaporator) and related control elements. Generally, the steam turbine 6 exhausts steam to a condenser 32 via line 34 and the condensate, with the aid of a pump 36, flows to the LP evaporator 16 via line 38. The LP evaporator is provided with an integral deaerator 40 upstream of the evaporator to insure removal of air from the condensate.

Low pressure steam from the LP evaporator 16 is supplied via line 42 to the combined LP/IP section 44 of the steam turbine 6.

Condensate (i.e., water) from LP evaporator 16 is also introduced into the IP evaporator 14 via line 46, feedwater transfer pump 48 and lines 50, 52. At the same time, condensate is also introduced into the HP evaporator 12 via line 46, pump 48 and line 54.

Intermediate pressure steam flows from IP evaporator 14 via line 56 and it is joined with cold reheat steam in line 58 from HP section 60 of steam turbine 6. The steam then flows into the reheater 62, and an attemporator 63 located between the low temperature section and high temperature section of the reheater (the low temperature section is upstream of the attemporator 63 in the direction of steam flow, and the high temperature section is downstream of the attemporator in the same direction.) After flowing through a reheater 62 (via line 64), the hot reheat steam is introduced into turbine section 44.

High pressure steam from HP evaporator 12 flows via line 66 and is joined with condensate from line 68 prior to flowing into a superheater 70 and attemporator 71. The steam then flows into the HP section 60 of the steam turbine 6. As in the case of the reheater, the attemporator 71 is located between the low and high temperature sections of the superheater.

Suitable flow bypass and/or control valves 72, actuator motors M and the like are utilized throughout the circuit in a conventional manner and need not be described in further detail here.

Exhaust gas from gas turbine 2 which enters the HRSG 10 via line 30 adjacent the reheater 62 and superheater 70, exits the HRSG 10 via line 74 adjacent the IP evaporator 16, it being understood that the exhaust gas from gas turbine 2 and condensate/steam associated with steam turbine 6 are arranged in a counterflow configuration.

It will be appreciated from the above described steam cycle, that the high temperature section of the reheater 62 is directly exposed to the highest temperature exhaust gases from the gas turbine 18. This arrangement presents a problem, in that in systems where multiple gas turbines and multiple HRSG's 10 are utilized with a single steam turbine, it is important that steam exhausting from the high pressure section 60 of steam turbine 6 be distributed evenly to the reheaters 62 in the multiple HRSG's, since reduced flow to any one of the reheaters may result in reheater temperatures above the rated operating temperature, thereby increasing the potential for damage to the reheater.

Moreover, since there is no flow through the reheater 62 on start-up of the HRSG 10, the reheater must be cooled during initial operation of the HRSG, prior to admitting steam to the steam turbine 6.

It has been observed that the high temperature section of the reheater 62 may be exposed to gas turbine exhaust gases of about 1140° F. Under these circumstances, if main steam mismatch were to occur as a result of uneven steam distribution to the various reheaters in a multiple gas turbine/HRSG system, temperatures of higher than 1000° F. may well be reached in the high temperature sections of one or more of the reheaters, with a real potential for damage due to overheating.

In addition, since there is no flow through the reheater 62 during start-up of the HRSG 10, the exhaust gases from the gas turbine 2 can easily cause overheating of the reheater 62. This problematic situation requires a bypass arrangement of the type illustrated in FIG. 2, it being understood that FIG. 2 shows a typical bypass for a single HRSG 110 and that a similar arrangement is used for each HRSG in a multiple gas turbine/HRSG system. This arrangement is commonly known by those skilled in the art as a "European bypass". It is sufficient for the purpose of this application to point out that the bypass arrangement involves the diversion of steam from superheater 170 through the reheater 162 via line 76 and associated motor actuator 78, i.e., the reheater and superheater are connected in series. The flow through the reheater 62 thus prevents the reheater from overheating until the reheater receives its normal flow. After exiting the reheater 162, the steam bypasses the steam turbine 6, and is diverted directly to the condenser 32 via line 80.

The above described bypass arrangement adds complexity and cost to the system. The present invention provides for a simplified and less costly bypass arrangement, as will be described further below in connection with FIG. 4.

Turning now to FIG. 3, a combined cycle system utilizing multiple gas turbines, HRSG's and a single steam turbine is shown diagrammatically, and with the unique steam cycle arrangement of this invention incorporated therein. Common components are designated with like reference numerals, but with a prime or double prime character added for clarity.

Specifically, the system illustrated in FIG. 4 utilizes a pair of gas turbines 2' and 2" which, respectively, provide hot exhaust gases to HRSG's 10' and 10", both of which provide steam for a single steam turbine 6'. It will be understood, however, that the invention is applicable to any combined cycle system utilizing more than one gas turbine and more than one HRSG.

Low pressure steam from the LP evaporator 16' exits the HRSG 10' via line 82, combines with low pressure steam in line 84 from the LP evaporator 16" in HRSG 10", and is returned to the low pressure section 44' of the steam turbine 6' via line 86.

Intermediate pressure steam exits the IP evaporator 14' of the HRSG 10' via line 88 and, after passing through the reheater 62', flows through line 90 and joins with intermediate pressure steam in line 92 from reheater 62" for introduction into the turbine section 44' via line 94.

High pressure steam exits from the HP evaporator 12' of the HRSG 10' via line 96, and after passing through the superheater 70', flows through line 98 and joins with high pressure steam in line 100 from the superheater 70" for introduction into the high pressure section 60' of the turbine 6' via line 102.

Condensate from the steam turbine 6' is distributed to the HRSG's 10' and 10" via lines 104, 106, respectively.

From a comparison of FIGS. 1 and 4, it will be apparent that the HRSG's 10, 10' and 10" are identical in all respects but one. The high temperature sections of superheaters 70' and 70", respectively, have been relocated so as to present the first heat exchange surfaces to the high temperature exhaust gases from the gas turbines 2' and 2", unlike the conventional practice, as shown in FIG. 1, where the high temperature section 63 of the reheater 62 presents the first heat exchange surfaces to the high temperature gas turbine exhaust gases.

As a result of the above described modification to the otherwise conventional HRSG construction, a temperature reduction is taken across the superheaters 70', 70" to thereby reduce the temperature of the gas turbine exhaust gas by, for example, about 100° F. As a result, the reheaters 62' and 62" are not subject to as great a temperature as in the prior constructions. This insures that the reheaters 62' and 62" are more tolerant of any mismatch which might occur as a result of uneven distribution of cold reheat steam to the HRSG's. At the same time, however, it is desirable that the surface areas of the reheater and superheater components be adjusted so that the steam exiting the reheater and superheater have substantially the same temperature.

It will be appreciated that the beneficial effects of this invention can be even further enhanced by providing sufficient heat exchange surfaces in the superheater to cause a larger temperature reduction in the gas turbine exhaust temperature, while adjusting the heat exchange surfaces in the reheater to insure substantially the same temperatures in the outlets of both the reheater and superheater.

In addition, since there is steam flow in the superheaters 70' and 70" (thereby enabling heat exchange with the gas turbine exhaust gases) even before HRSG start-up, the reheaters 62' and 62" are not prone to the same overheating problems experienced by reheater 62 on start-up of the HRSG, thereby eliminating the need for the costly and complex bypass system shown in FIG. 2.

FIG. 4 illustrates a simplified steam bypass system for use in multiple gas turbine/HRSG systems of the type illustrated in FIG. 4. As will be appreciated from the bypass system illustrated in FIG. 5, the need for diverting steam from the superheater 270 to the reheater 262 in the HRSG 210 has been eliminated so that, during HRSG start-up, it is only required that steam from the superheater 270 bypass the steam turbine 206 and flow directly to the condenser 232. FIG. 4 also illustrates how steam from the superheaters of other of the multiple HRSG's is also directed to the condenser 232 around the steam turbine 206. This arrangement thus eliminates the need for a number of valves and motor actuators required in prior art bypass systems.

In addition to the reheat steam cycle described hereinabove, the present invention also relates to a method for supplying steam to a steam turbine from a plurality of heat recovery steam generators, each of which transfers heat from exhaust gas from associated gas turbine to convert condensate exhausted from a steam turbine back to steam for reintroduction into the steam turbine. While the manner of operation of the individual components of the system described hereinabove is well understood in the art, the method in accordance with this invention comprises, in its broader aspects the steps of:

(a) locating a high temperature section of the superheater (70' or 70") adjacent a gas turbine exhaust gas inlet to the heat recovery steam generator (10' or 10");

(b) locating a high temperature section of the reheater (62' or 62") adjacent the superheater (70' or 70"), downstream of the high temperature section of the superheater (70' or 70") in a direction of flow of the gas turbine exhaust gas; and (c) flowing condensate and steam from the steam turbine (6') in a direction opposite the direction of flow of the gas turbine exhaust gas so that the gas turbine exhaust gas is at a reduced temperature when it passes over the reheater (62' or 62") to thereby minimize potential overheating in the reheater.

In further conjunction with the manner of operation of the above described system, and prior to start-up of the steam turbine 6', steam from the superheater (70' or 70") is bypassed around the steam turbine 6' to the condenser 32'. Once the steam turbine and multiple gas turbines and HRSG's are operating normally, steam from the superheater is reintroduced into the steam turbine.

It will be appreciated from the description provided hereinabove, that the present invention solves potential overheating problems related to uneven distribution of condensate to multiple HRSG's, and to insufficient steam flow in reheaters during HRSG start-up in a simple but nevertheless unique manner which enhances the overall operation of the system at less cost.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a combined cycle power system in which condensate from a steam turbine is heated in at least one heat recovery steam generator by exhaust gas from at least one gas turbine, and wherein said at least one heat recovery steam generator includes at least one superheater connected to a high pressure section of the steam turbine and at least one reheater connected to a lower pressure section of the steam turbine, the improvement comprising at least a high temperature section of the superheater within the heat recovery steam generator located so as to present first heat exchange surfaces to exhaust gas entering the heat recovery steam generator from said at least one gas turbine so that a reduction in temperature is effected in said exhaust gas across said superheater to thereby prevent overheating of said reheater; and a bypass arrangement for use in start up of the heat recovery steam generator consisting of means for bypassing steam from said superheater past said steam turbine directly to a condenser which receives exhaust steam from said steam turbine, and from which the condensate is passed to said heat recovery steam generator; and wherein said superheater receives steam from a high pressure evaporator; and wherein said reheater receives steam from an intermediate pressure evaporator.

2. The combined cycle power system of claim 1 wherein said reheater also receives cold reheat steam from a high pressure section of the steam turbine.

3. The combined cycle power system of claim 1 wherein said reheater supplies steam to a combined intermediate pressure/low pressure section of the steam turbine.

4. In a combined cycle power system in which condensate from a steam turbine is heated in at least one heat recovery steam generator by exhaust gas from at least one gas turbine, and wherein said at least one heat recovery steam generator includes at least one superheater connected to a high pressure section of the steam turbine and at least one reheater connected to a lower pressure section of the steam turbine, the improvement comprising at least a high temperature section of the superheater within the heat recovery steam generator located so as to present first heat exchange surfaces to exhaust gas entering the heat recovery steam generator from said at least one gas turbine so that a reduction in temperature is effected in said exhaust gas across said superheater to thereby prevent overheating of said reheater; and a bypass arrangement for use in start up of the heat recovery steam generator consisting of means for bypassing steam from said superheater past said steam turbine directly to a condenser which receives exhaust steam from said steam turbine, and from which the condensate is passed to said heat recovery steam generator; and wherein said superheater receives steam from a high pressure evaporator; and further wherein said system comprises multiple gas turbines and multiple heat recovery steam generators.

5. In a combined cycle power system in which condensate from a steam turbine is heated in at least one heat recovery steam generator by exhaust gas from at least one gas turbine, and wherein said at least one heat recovery steam generator includes at least one superheater connected to a high pressure section of the steam turbine and at least one reheater connected to a lower pressure section of the steam turbine, the improvement comprising at least a high temperature section of the superheater within the heat recovery steam generator located so as to present first heat exchange surfaces to exhaust gas entering the heat recovery steam generator from said at least one gas turbine so that a reduction in temperature is effected in said exhaust gas across said superheater to thereby prevent overheating of said reheater; and a bypass arrangement for use in start up of the heat recovery steam generator consisting of means for bypassing steam from said superheater past said steam turbine directly to a condenser which receives exhaust steam from said steam turbine, and from which the condensate is passed to said heat recovery steam generator; wherein said superheater receives steam from a high pressure evaporator; and further wherein an attemporator is located between a low temperature section and a high temperature section of said reheater.

6. In a combined cycle power system in which condensate from a steam turbine is heated in at least one heat recovery steam generator by exhaust gas from at least one gas turbine, and wherein said at least one heat recovery steam generator includes at least one superheater connected to a high pressure section of the steam turbine and at least one reheater connected to a lower pressure section of the steam turbine, the improvement comprising at least a high temperature section of the superheater within the heat recovery steam generator located so as to present first heat exchange surfaces to exhaust gas entering the heat recovery steam generator from said at least one gas turbine so that a reduction in temperature is effected in said exhaust gas across said superheater to thereby prevent overheating of said reheater; and a bypass arrangement for use in start up of the heat recovery steam generator consisting of means for bypassing steam from said superheater past said steam turbine directly to a condenser which receives exhaust steam from said steam turbine, and from which the condensate is passed to said heat recovery steam generator; wherein said superheater receives steam from a high pressure evaporator; and further wherein an attemporator is located between a low temperature section and said high temperature section of said superheater.

7. In a combined cycle power system in which condensate from a steam turbine is heated in at least one heat recovery steam generator by exhaust gas from at least one gas turbine, and wherein said at least one heat recovery steam generator includes at least one superheater connected to a high pressure section of the steam turbine and at least one reheater connected to a lower pressure section of the steam turbine, the improvement comprising at least a high temperature section of the superheater within the heat recovery steam generator located so as to present first heat exchange surfaces to exhaust gas entering the heat recovery steam generator from said at least one gas turbine so that a reduction in temperature is effected in said exhaust gas across said superheater to thereby prevent overheating of said reheater; and a bypass arrangement for use in start up of the heat recovery steam generator consisting of means for bypassing steam from said superheater past said steam turbine directly to a condenser which receives exhaust steam from said steam turbine, and from which the condensate is passed to said heat recovery steam generator; wherein said superheater receives steam from a high pressure evaporator; and further wherein said system includes at least two gas turbines and two heat recovery steam generators for supplying steam to a single steam turbine.

8. A reheat steam cycle configuration for a steam turbine and gas turbine combined cycle system comprising:

a steam turbine connected to a load;

a condenser for receiving exhaust steam from the steam turbine and for condensing said exhaust steam to water;

at least one heat recovery steam generator for receiving water from said condenser and for converting said water to steam for return to said steam turbine;

at least one gas turbine for supplying heat to said heat recovery steam generator in the form of exhaust gases;

wherein said at least one heat recovery steam generator includes a reheater means for receiving cold reheat steam from the steam turbine and for introducing steam into said steam turbine and a superheater for receiving high pressure steam from a high pressure evaporator within said heat recovery steam generator, and for introducing superheater steam into a high pressure section of said turbine, and wherein said cold reheat steam and said high pressure steam flow in a direction opposite to that of said exhaust gases from said gas turbine, a high temperature section of said superheater being located within said heat recovery steam generator where gas turbine exhaust gas temperature are highest, so that a temperature reduction is effected in the exhaust gas temperature across said superheater thereby preventing overheating of said reheater; and a bypass arrangement for use in start up of the heat recovery steam generator, said bypass arrangement consisting of means for bypassing steam from said superheater around said steam turbine to said condenser;

and wherein said heat recovery steam generator also includes a low pressure evaporator and an intermediate pressure evaporator.

9. A reheat steam cycle configuration according to claim 8 wherein said high pressure steam from said superheater is returned to a high pressure section of said steam turbine.

10. A reheat steam cycle configuration according to claim 8 wherein said exhaust gases from said gas turbine exit said heat recovery steam generator adjacent said low pressure evaporator.

11. A reheat steam cycle configuration according to claim 9 wherein steam from said low pressure evaporator and said intermediate pressure evaporator is returned to a combined low pressure/intermediate pressure section of said steam turbine.

12. A reheat steam cycle configuration according to claim 11 wherein a portion of condensate introduced into said low pressure evaporator is routed to said reheater.

13. A reheat steam cycle configuration according to claim 12 wherein said system includes at least two gas turbines and two heat recovery steam generators for supplying steam to a single steam turbine.

14. The combined cycle power system of claim 8 and including an attemporator located between a low temperature section and a high temperature section of said reheater.

15. The combined cycle power system of claim 8 and including an attemporator located between a low temperature section and said high temperature section of said superheater.

16. A reheat steam cycle configuration for a steam turbine and gas turbine combined cycle system comprising:
   a steam turbine connected to a load;
   a condenser for receiving exhaust steam from the steam turbine and for condensing said exhaust steam to water;
   at least one heat recovery steam generator for receiving water from said condenser and for converting said water to steam for return to said steam turbine;
   at least one gas turbine for supplying heat to said heat recovery steam generator in the form of exhaust gases;
   wherein said at least one heat recovery steam generator includes a reheater means for receiving cold reheat steam from the steam turbine and for introducing steam into said steam turbine and a superheater for receiving high pressure steam from a high pressure evaporator within said heat recovery steam generator, and for introducing superheater steam into a high pressure section of said turbine, and wherein said cold reheat steam and said high pressure steam flow in a direction opposite to that of said exhaust gases from said gas turbine, a high temperature section of said superheater being located within said heat recovery steam generator where gas turbine exhaust gas temperature are highest, so that a temperature reduction is effected in the exhaust gas temperature across said superheater thereby preventing overheating of said reheater; and
   a bypass arrangement for use in start up of the heat recovery steam generator, said bypass arrangement consisting of means for bypassing steam from said superheater around said steam turbine to said condenser; and further
   wherein said system includes at least two gas turbines and two heat recovery steam generators for supplying steam to a single steam turbine.

17. A method for supplying steam to a steam turbine from a plurality of heat recovery steam generators, each of which includes a plurality of evaporators, a reheater and a superheater and wherein at least said reheater and superheater are arranged in heat exchange relationship with hot exhaust gas from a gas turbine, and further wherein said reheater is configured and arranged to introduce reheated steam into said steam turbine and said superheater is configured and arranged to introduce superheated steam into said steam turbine, the method comprising the steps of:
   a) locating a high temperature section of the superheater adjacent a gas turbine exhaust gas inlet to said heat recovery steam generator;
   b) locating a high temperature section of said reheater adjacent said superheater, downstream of said high temperature section of said superheater in a direction of flow of said gas turbine exhaust gas; and
   c) flowing condensate and steam from said steam turbine in a direction opposite said direction of flow of said gas turbine exhaust gas so that said gas turbine exhaust gas is at a reduced temperature when it passes over said reheater to thereby minimize potential overheating in said reheater;
   wherein prior to start-up of the steam turbine, and during start-up of each of the heat recovery steam generators, steam from the superheater is bypassed around the steam turbine to a condenser which receives exhaust steam from the steam turbine.

18. The method of claim 17 wherein prior to start-up of the steam turbine, steam from the superheater is bypassed around the steam turbine to a condenser.

19. The method of claim 17 and including the step of maintaining steam from said superheater and said reheater at substantially the same temperature.

20. A method for supplying steam to a steam turbine from a plurality of heat recovery steam generators, each of which includes a plurality of evaporators, a reheater and an adjacent superheater and wherein at least said reheater and superheater are arranged in heat exchange relationship with hot exhaust gas from a gas turbine, and further wherein said reheater is configured and arranged to introduce reheated steam into said steam turbine and said superheater is configured and arranged to introduce superheated steam into said steam turbine, the method comprising the steps of:
   a) locating a high temperature section of the superheater adjacent a gas turbine exhaust gas inlet to said heat recovery steam generator;
   b) locating a high temperature section of said reheater adjacent said superheater, downstream of said high temperature section of said superheater in a direction of flow of said gas turbine exhaust gas; and
   c) flowing condensate and steam from said steam turbine in a direction opposite said direction of flow of said gas turbine exhaust gas so that said gas turbine exhaust gas is at a reduced temperature when it passes over said reheater to thereby minimize potential overheating in said adjacent reheater.

* * * * *